United States Patent [19]

Kuwabara et al.

[11] Patent Number: 4,870,428

[45] Date of Patent: Sep. 26, 1989

[54] DRIVING METHOD FOR THERMAL HEAD AND THERMAL PRINTER UTILIZING THE SAME

[75] Inventors: Nobuyuki Kuwabara, Tokyo; Ko Hasegawa, Yokohama; Yuichi Watanabe, Machida; Haruhiko Moriguchi, Yokohama, all of Japan

[73] Assignee: Canon Kabushiki Kaisha, Tokyo, Japan

[21] Appl. No.: 162,258

[22] Filed: Feb. 29, 1988

[30] Foreign Application Priority Data

Mar. 2, 1987 [JP] Japan .................................. 62-45195

[51] Int. Cl.⁴ .......................... G01D 15/10; B41J 3/20

[52] U.S. Cl. ................................ 346/76 PH; 400/120

[58] Field of Search .................... 346/76 PH; 400/120

[56] References Cited

U.S. PATENT DOCUMENTS 4,309,712 1/1982 Iwakura .
4,370,666 1/1983 Noda et al. .
4,415,908 11/1983 Sugiura .
4,479,132 10/1984 Iwakura .
4,567,488 1/1986 Moriguchi et al. ............ 346/76 PH
4,734,712 3/1988 Kanemura ...................... 400/120 X

*Primary Examiner*—George H. Miller, Jr.
*Attorney, Agent, or Firm*—Fitzpatrick, Cella, Harper & Scinto

[57] ABSTRACT

A driving method for a thermal head having plural heat generating elements for image recording on a recording medium comprises a step of detecting the presence of past, present and future heating signals in an area, in at least four directions around the heat generating element when the power is supplied to a heat generating element according to a heating signal and a step of controlling the supply energy to the heat generating element in response to the result of the detection, if the heating signals are present in all of the detecting area, for minimizing the supply energy to the heat generating element in comparison with a case in which the heating signals are not present in all of the detecting area.

16 Claims, 7 Drawing Sheets

DRIVING METHOD FOR THERMAL HEAD AND THERMAL PRINTER UTILIZING THE SAME

BACKGROUND OF THE INVENTION

1. Field of the Invention

The present invention relates to a driving method for a recording head for thermal recording by selective heat generation in plural heat generating elements in response to heat generating signals, and to a thermal printer utlizing said driving method.

The above-mentioned driving method for the thermal head and the thermal printer utilizing said driving method are adapted for use in a recording apparatus such as a printer for computer output, an electronic typewriter, a copying machine, a facsimile machine or the like.

2. Related Background Art

Rapid progress in the information industry in recent years has stimulated development of various information processing systems, with suitable recording methods and apparatus therefor. Among such recording methods there is already known a thermal recording method, which is recently widely used due to the compactness and light weight of the apparatus, absence of noise in operation, excellent operability and ease of maintenance.

Such thermal recording method is classified into thermal-sensitive recording and thermal transfer recording. The former uses a thermo-sensitive recording sheet, containing a color generating material and a color developing material and capable of generating a color, as the recording medium, and forms a recorded image by heat signals given by a recording head having an array, on a substrate, of plural heat generating elements capable of generating heat by electric power supply. The latter uses a thermal transfer material having, on a substrate film, a thermally transferable coating composed of a coloring material dispersed in a heat fusible binder, and forms a recorded image by overlaying said thermal transfer material with a recording medium such as paper, with said thermal transfer ink coating in contact with said recording medium and supplying heat signals by said recording head across the substrate of said thermal transfer material, thereby fusing and transferring said thermal transfer ink onto said recording medium.

However, such thermal recording methods, both thermal-sensitive recording and thermal transfer recording, may be associated with the following concern. In selective activation of the heat generating elements according to the image information, if constant energy is given to said elements regardless of the types of image information, there may result uneven density in the recorded image, due to the difference in cooling and heat accumulation inside the substrate and glaze of the recording head depending on the nature of the image information.

More specifically, the temperature or accumulated heat in the recording head immediately before activation of the heat generating element is different in a case of activating the heat generating element after absence of image information for a while in the scanning direction of the recording head, than in a case of continuously activating the element in response to continuous image information, so that the temperature realized by the heat from said element also becomes different.

Consequently, if the electric energy supplied to the heat generating element is maintained always constant, there may result unevenness in the density in an area composed of a large number of dots, or a large color-developed area of the thermo-sensitive sheet or a large ink-transfer area of the thermal transfer ink.

Also in the thermal transfer recording, when the recorded image is formed as a film which does not penetrate into the recording medium and can be lifted off for erasing an erroneous record, the ink may be fused excessively in a large transfer area due to the accumulated heat thus causing diffusion into the recording medium and resulting in an uneven erasure in such lift-off operation.

SUMMARY OF THE INVENTION

An object of the present invention is to provide a driving method for a thermal head, capable of providing a clear recorded image, and a thermal printer utilizing said driving method.

Another object of the present invention is to provide a driving method for a thermal head, capable of providing a recorded image with uniform density, and a thermal printer utilizing said driving method.

Still another object of the present invention is to provide a driving method for a thermal head, capable of providing a recorded image with stable image quality, and a thermal printer utilizing said driving method.

Still another object of the present invention is to provide a driving method for a thermal head, capable of providing a recorded image which can be completely erased if necessary, and a thermal printer utilizing said driving method.

Still another object of the present invention is to provide a driving method for a thermal head, capable of providing a recorded image which does not excessively penetrate into a recording medium, and a thermal printer utilizing said driving method.

Still another object of the present invention is to provide a driving method for a thermal head, capable of providing a recorded image which can be uniformly erased if necessary, and a thermal printer utilizing said driving method.

Still another object of the present invention is to provide a driving method for a thermal head for image recording with an emulsion ink ribbon and a thermal printer utilizing said driving method.

Still another object of the present invention is to provide a driving method for a thermal head, without unevenness in the recording density, deterioration in image quality resulting from excessive penetration of the thermal transfer ink into the recording medium, or instability of the erasure of erroneous recording, and a thermal printer utilizing said driving method.

DETAILED DESCRIPTION OF THE PREFERRED EMBODIMENTS

In the following there will be explained an embodiment of the thermal head driving method of the present invention, and an embodiment of the thermal printer utilizing said driving method, while making reference to the attached drawings.

The following embodiment is a driving method for a recording head for thermal recording provided with plural heat generating elements capable of generating heat by electric power supply, which comprises, at the power supply to a heat generating element in response to a heating signal, detecting the presence of heating signals in a predetermined area around said heat generating element to be activated, and, in controlling the energy supply to said heat generating element according to the result of said detection, minimizing said energy supply at least when the heating signals are present in all the positions of said predetermined area; and a thermal printer utilizing such driving method.

The dots constituting an image are formed by the heat generation of the heat generating element, and, if the dots are present in succession, heat tends to be accumulated in the recording head due to repeated heat generation. In the present embodiment, therefore, the state of image dots or the presence of heating signals around the image dot to be formed by the activation of a heat generating element is detected, and the electric energy to be supplied to said heat generating element is reduced if the number of said heating signals is large, thereby preventing application of excessive heat resulting from heat accumulation in the substrate or glaze of the recording head.

Figure 1:
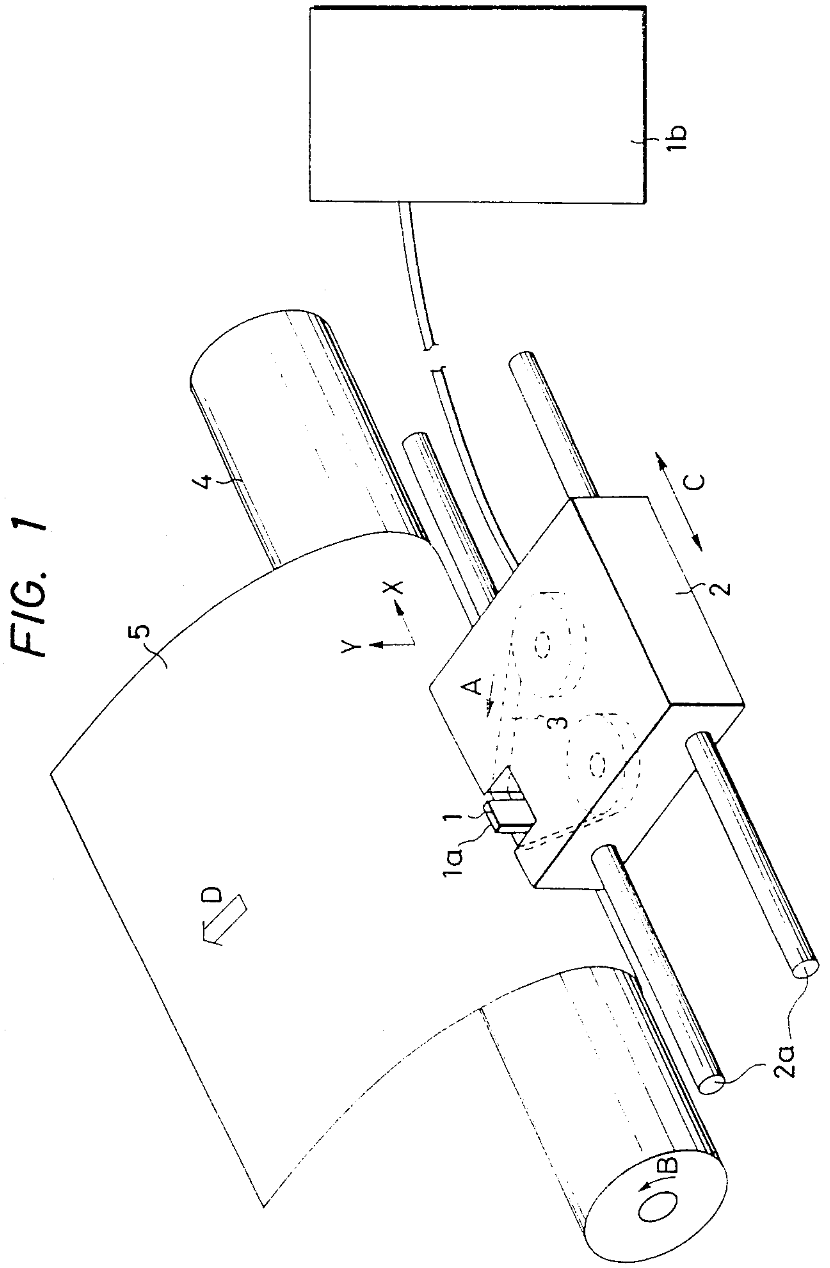
FIG. 1 is a schematic view of a thermal recording apparatus in which an embodiment of the present invention is applicable.

Now there will be explained an embodiment of the present invention while making reference to the attached drawings. FIG. 1 shows a thermal transfer recording apparatus utilizing the above-explained method.

In FIG. 1, a serial-type recording head 1 is mounted on a carriage 2 movable in a direction X (main scanning direction) along rails *2a*. The recording head 1 is mounted in such a manner that it can be lowered against a platen roller 4 with a predetermined pressure (head down operation) across an ink ribbon 3 which is likewise mounted on the carriage 2 and advanced gradually in a direction A, and a recording medium 5 (for example recording paper or plastic sheet, hereinafter called recording sheet) supported on the platen roller 4. The platen roller 4 is rotated counterclockwise (direction B) to advance the recording sheet 5 in succession in a direction D to the recording position by the recording head 1.

Figure 2:
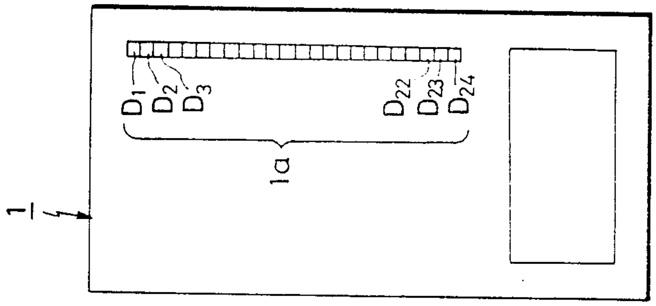
FIG. 2 is a schematic view of a recording head.

The recording head 1 is provided, as shown in FIG. 2, with a vertical linear array of twenty-four heat generating elements 1*a* on the surface of a head substrate facing the ink ribbon 3. The heat generating elements 1*a* individually generate heat by electric power supply, and are activated by heating signals from a control unit 1*b*. Thus, at the recording, the recording head 1 is shifted down while the carriage 2 is moved in the main scanning direction (direction C or lateral direction of the recording sheet 5), and the heat generating elements 1*a* are activated according to the image information synchronized with said movement, whereby the thermal transfer ink coated on the ink ribbon 3 is fused imagewise and is transferred onto the recording sheet 5. After the transfer recording of a line, the recording head 1 is shifted up, the carriage 2 is returned to the home position, and the platen roller 4 is rotated to advance the recording sheet 5 in a direction Y (sub-scanning direction) by a line. The recording is thereafter conducted by repeating the above-explained procedure.

Figure 3:
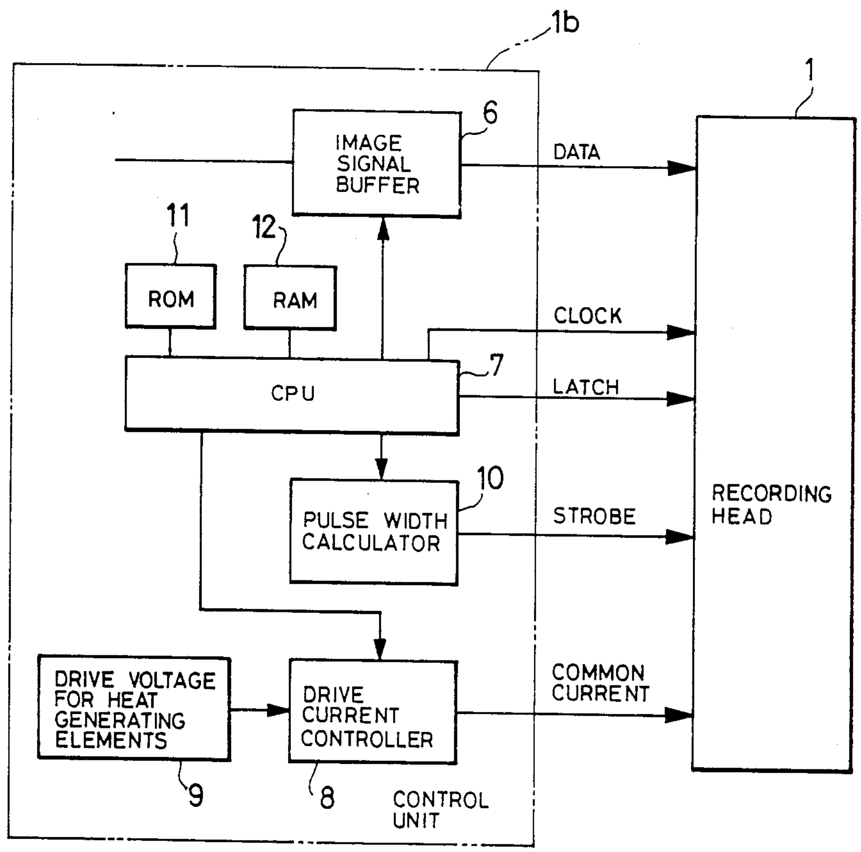
FIG. 3 is a block diagram of a drive control unit for the recording head.

The above-explained recording head 1 is driven by a control unit 1*b* shown in FIG. 3. Data to be recorded are released from an image signal buffer 6 and supplied to the recording head 1 in synchronization with a clock signal released by a CPU 7 (micro-processor or sequence controller), and said data are set by a latch signal sent after the signal supply. On the other hand, a common current is supplied from a power source 9 through a driving current controller 8, and a strobe signal is given to the recording head 1 corresponding to the driving pulse width calculated by a pulse width calculator 10. During the presence of the strobe signal, the common current is supplied to the heat generating element 1*a* to generate heat therein.

Figure 7:
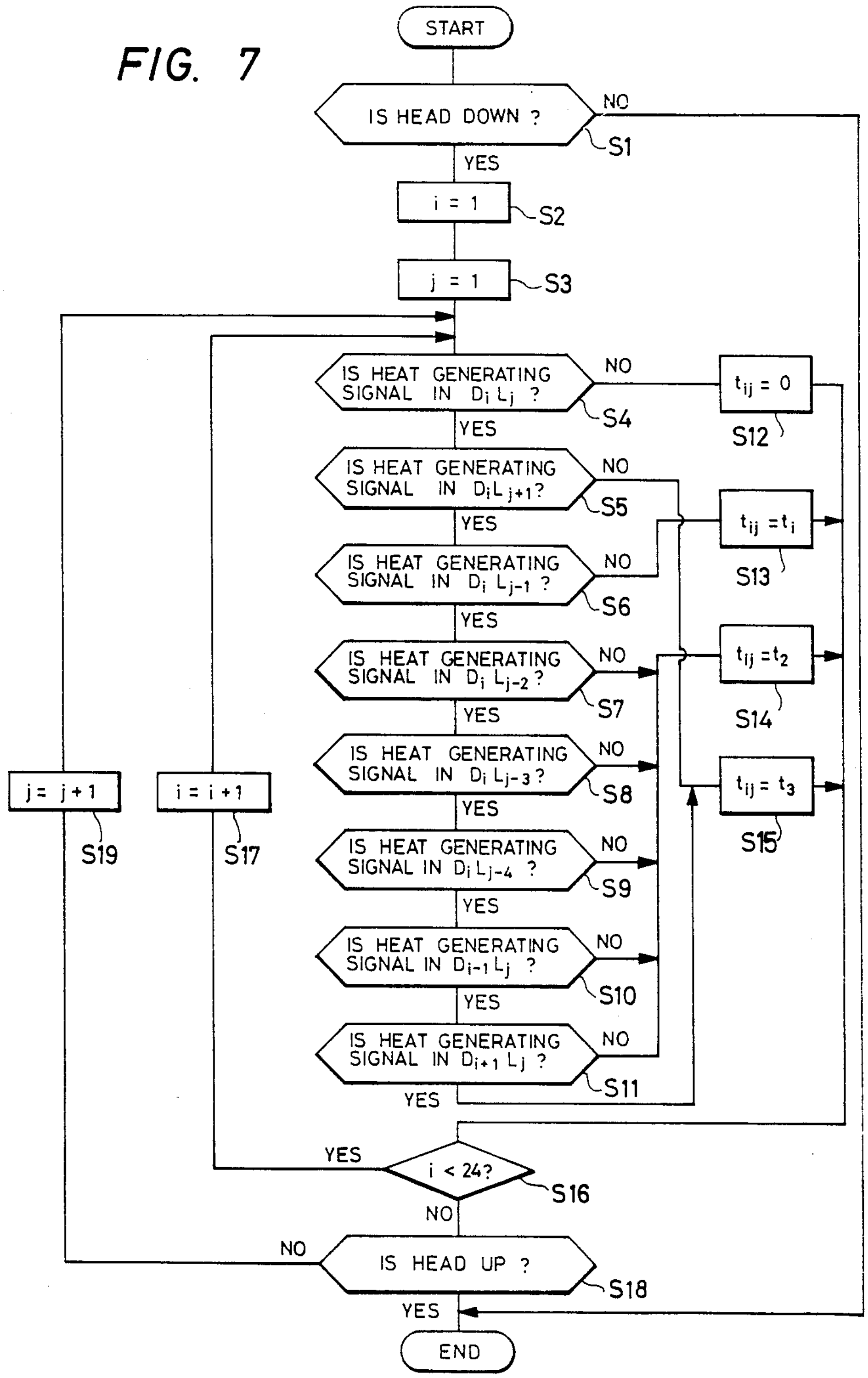
FIG. 7 is a flow chart showing the control sequence for determining the pulse duration.

The CPU 7 releases various control signals according to a control program stored in a ROM 11 and shown by a flow chart in FIG. 7. It also processes input signals from an unrepresented input interface unit and gives various signals to an unrepresented output interface unit, thereby controlling the operations such as the recording operation. A RAM 12 is used as a working area of the CPU 7.

In the following there will be explained a driving method for the above-explained recording head.

The heat generating elements 1*a* of the recording head 1 generate heat by electric current supply corresponding to the heating signal from the control unit 1*b* as explained before, and the energy of said electric current supply is controlled according to the result of detection whether the heating signals are present in several dots within a predetermined area around the heat generating element 1*a* to be activated.

Figure 4:
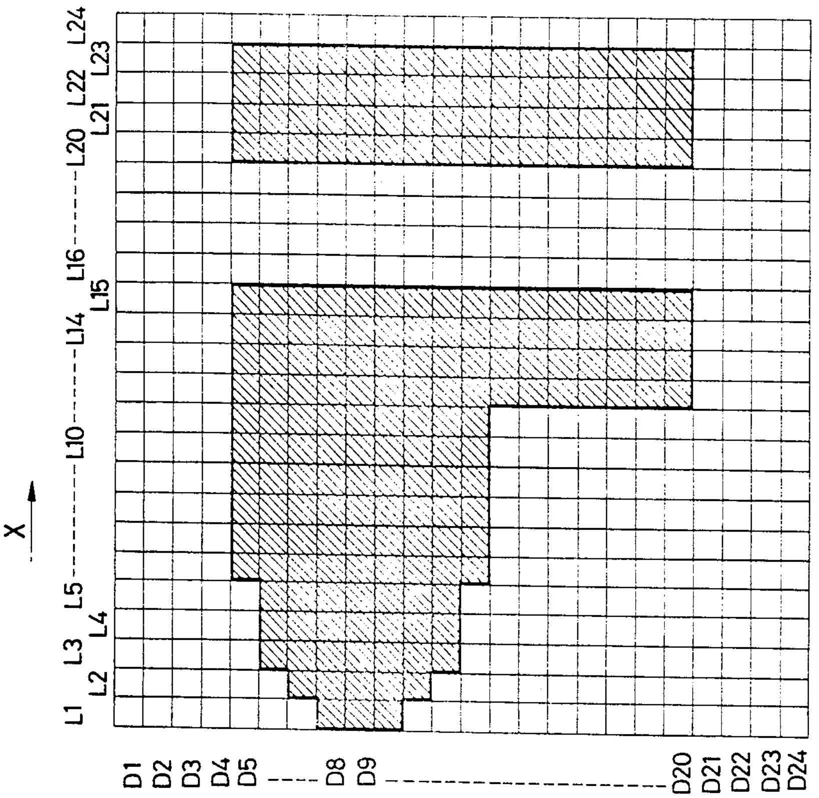
FIG. 4 is a view showing an example of the recorded image pattern.
Figure 5:
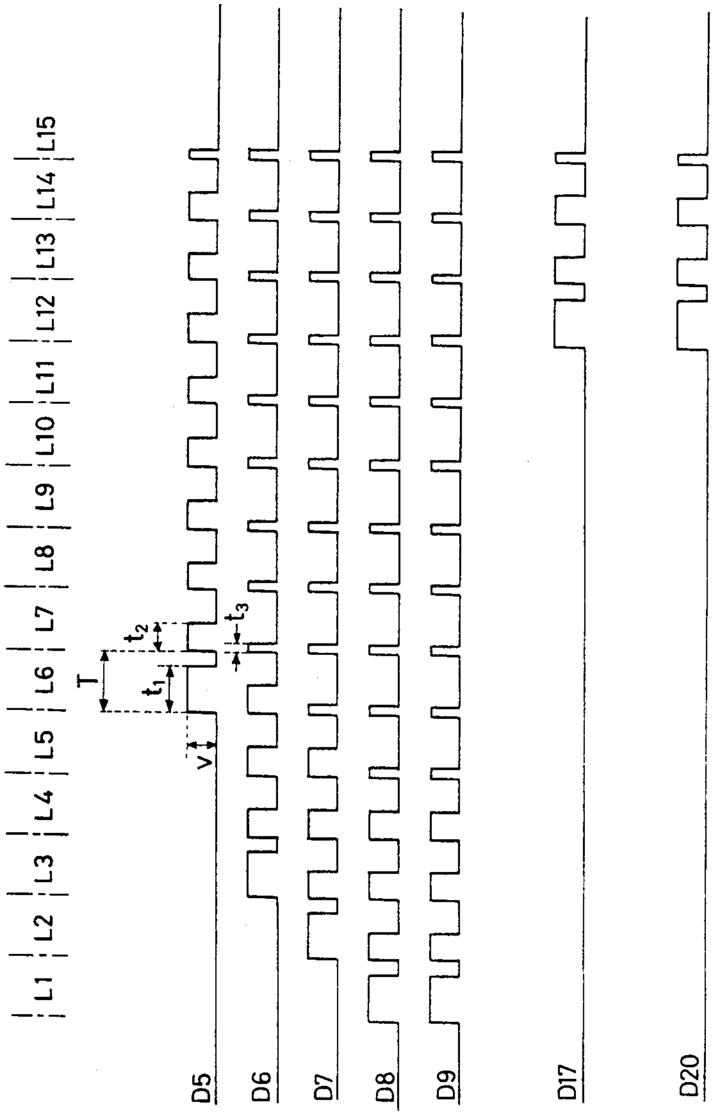
FIG. 5 is a chart showing the duration of electric pulses to the heat generating elements in recording a part of the pattern shown in FIG. 4.

More specifically, for example in the case of recording an image pattern as shown in FIG. 4, the strobe signals controlling the electric power supply to the heat generating elements 1*a* of the recording head 1 are composed of pulses shown in FIG. 5.

In FIG. 4, the vertically arranged heat generating elements 1*a* are serially numbered from the top as $D_1$, $D_2$, . . . , $D_{23}$, $D_{24}$, and the columns in the scanning direction of the recording head 1 are numbered from left to right as $L_1$, $L_2$, . . . , $L_{23}$, $L_{24}$. FIG. 5 shows an example of energy control on the heat generating elements $D_5$, $D_6$, $D_7$, $D_8$, $D_9$, $D_{17}$ and $D_{20}$ in the scanning direction of the recording head 1 by varying the pulse width under a constant voltage, wherein V is the voltage supplied to the heat generating elements, T is a pulse cycle time which is equal to 2.0 ms in this case, and $t_1$, $t_2$ and $t_3$ are pulse widths.

As the recording head 1 advances along the scanning direction in the order of $L_1$, $L_2$, $L_3$, . . . in the pattern shown in FIG. 4, each of the heat generating elements $D_5$–$D_{20}$ does not have heat accumulation in the glaze immediately under the heat generating portion at a record starting dot at the left-hand end, since no heat generation is made up to said dot. However, in any subsequent dot, heat is accumulated under the heat generating portion because a heating signal is given in the preceding dot. Also in a further advanced position along the scanning direction, for example at the column $L_{10}$ of the element $D_9$ shown in FIG. 4, heat is transferred from the neighboring elements simultaneously activated. The amount of heat generation is varied in consideration of these facts, thereby improving the transfer of ink of the ink ribbon 3. Thus, in the present embodiment, the electric power supply for a dot is controlled by detecting the heating signals in an area of four preceding dots, one succeeding dot, one upper dot and one lower dot.

In this manner the presence of heating signals is detected, around the heat generating element to be activated, more than four directions corresponding to past, present and future. More specifically, the four directions indicate the presence of heating signals in the heat generating elements immediately before (future) and after (past) the above-mentioned element to be activated, and in those positioned above and below said heat generating element.

Figure 6:
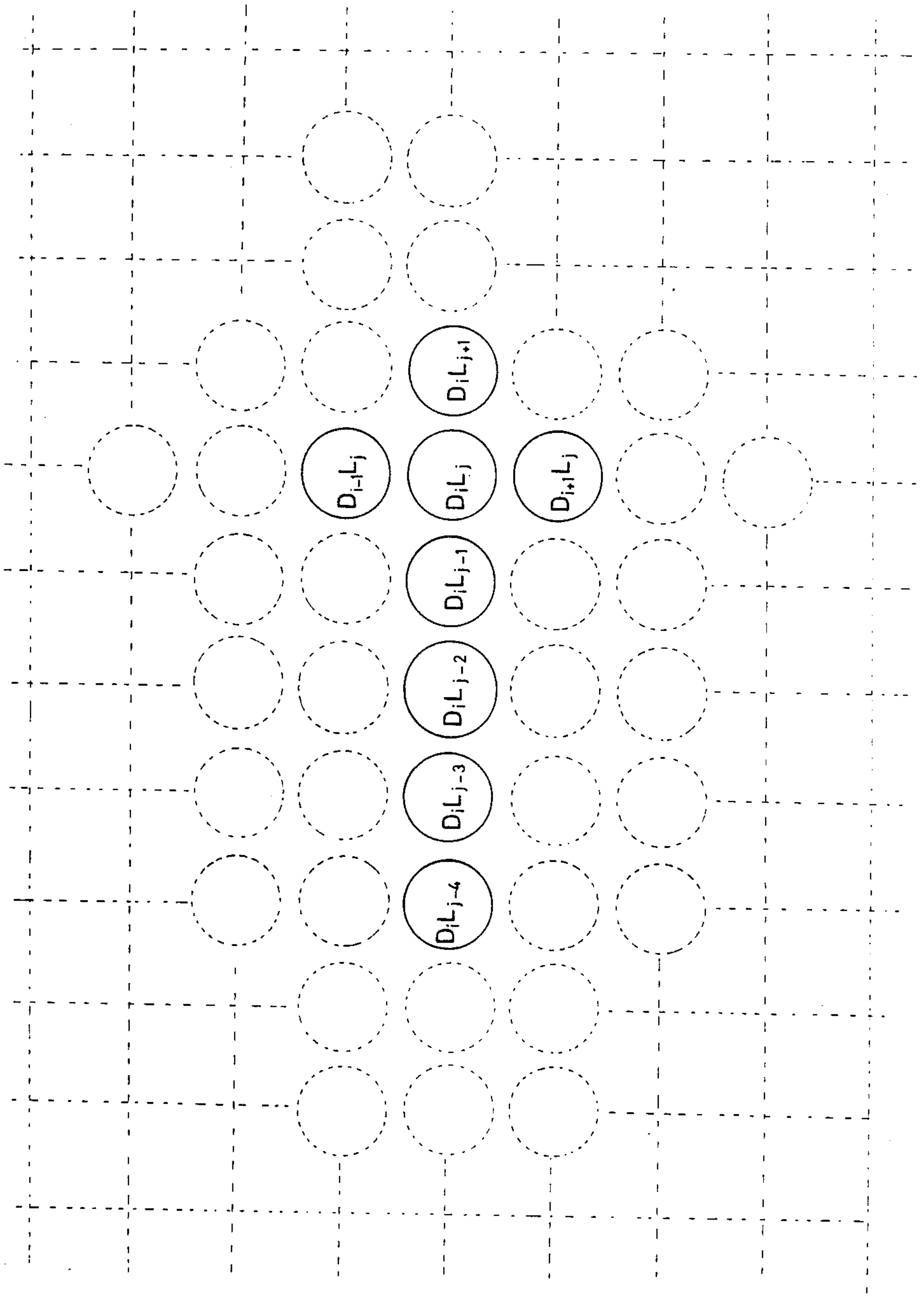
FIG. 6 is a view showing an example of a detection area.

FIG. 6 illustrates the above-mentioned detecting area wherein circles indicate dots constituting the image. A circle $D_iL_j$ indicates a dot to be activated. and the detecting area is indicated by solid-lined circles, including four dots $D_iL_{j-l}$-$D_iL_{j-4}$ preceding the abovementioned dot $D_iL_j$ in the scanning direction, a succeeding dot $D_iL_{j+l}$, an upper dot $D_{i-l}L_j$ and a lower dot $D_{i+l}L_j$, but the detection is not carried out on the other broken-lined circles.

The control is conducted according to the following algorithm, in response to the results of detection:

(1) The duration of electric power supply, or the pulse width, in a pulse cycle time T, is selected as $t_1=1.5$ ms, $t_2=0.9$ ms or $t_3=0.3$ ms;

(2) If the heating signal is absent in a dot immediately preceding the dot to be activated, the pulse width is selected at the large value $t_1$, thus achieving rapid temperature elevation;

(3) If the heating signal is present in a dot immediately preceding the dot to be activated, the pulse width is selected at the middle value $t_2$;

(4) If the heating signals are present in four dots preceding the dot to be activated, in an immediately succeeding dot, in an upper dot and a lower dot, the pulse width is selected at the smallest value $t_3$;

(5) On the other hand, if the heating signal is absent in a dot immediately succeeding the dot to be activated, the pulse width is selected at the smallest value $t_3$, thus accelerating the temperature decrease.

The amount of electric energy supplied to the heat generating elements 1*a* in the recording head 1 is controlled through the regulation of the pulse width in the pulse width calculator shown in FIG. 3.

This control sequence is shown in a flow chart in FIG. 7. At first a step S1 detects whether the recording head 1 is in a down state, and, if the head has been shifted down, steps S2 and S3 are respectively set i=1 and j=1. Then a step S4 detects whether a heating signal is present in the heat generating element to be activated, and, if present, the sequence proceeds to a step S5. On the other hand, if the heating signal is absent, the sequence proceeds to a step S12 for setting the pulse width $t_{ij}$ to "0", and then proceeds to a step S16.

The step S5 detects whether a heating signal is present at a dot $D_iL_{j+l}$ immediately succeeding the dot to be activated, and, if present, the sequence proceeds to a step S6. On the other hand, if the heating signal is absent, a step S15 sets the pulse width $t_{ij}$ at $t_3$, and the sequence proceeds to a step S16.

The step S6 detects whether a heating signal is present at a dot $D_iL_{j-l}$ immediately preceding the dot to be activated, and, if present, the sequence proceeds to a step S7. If the heating signal is absent, a step S13 sets the pulse width $t_{ij}$ at $t_l$, and the sequence proceeds to a step S16.

Then steps S7 to S11 detect, in succession, whether heating signals are present at the 2nd to 4th dots $D_iL_{j-2}$, $D_iL_{j-3}$ and $D_iL_{j-4}$ preceding the dot to be activated, and at an upper dot $D_{i-l}L_j$ and a lower dot $D_{i+l}L_J$, and, if the heating signal is absent in any of said dots, the sequence proceeds to a step S14 to set the pulse width $t_{ij}$ at $t_2$, and then to the step S16. On the other hand if, the heating signals are present at all of said dots, the sequence proceeds to a step S15 to set the pulse width $t_{ij}$ at $t_3$ and proceeds then to a step S16.

The step S16 discriminates whether the value i is smaller than 24, and, if smaller, the sequence proceeds to a step S17 for increasing the value of i by one, and returns then to the step S4. On the other hand, if i=24, the sequence proceeds to a step S18. In this manner the steps S4 to S15 are repeated in succession from the 1st to 24th heat generating elements vertically arranged. Then a step S18 detects whether the recording of a line is completed, and, if not, a step S19 executes a movement to a next column, and the recording operation is continued by repeating the above-explained steps S4–S17.

The above-explained control of the electric energy to be supplied to the heat generating element *a* prevents the heat accumulation in the glaze or substrate of the recording head, thus avoiding unevenness in the image density.

In the following there will be explained the thermal transfer ink of the preferred ink ribbon 3 employed in the thermal transfer recording with the above-explained method.

The thermal transfer ink need not be special ink but can be ordinary ink, but should preferably form a film-shaped image without penetration into the recording sheet 5 after transfer, in consideration of erasure of an erroneous recording by lift-off. In the thermal transfer recording, if the ink to be transferred shows a rapid decrease in viscosity upon fusing by the recording head 1, it will form an image which penetrates into the recording sheet 5 and cannot be easily peeled off by a lift-off operation.

Examples of the main component of preferred thermal transfer ink for forming a film-formed recorded image includes ethylene-acrylic acid copolymers, ethylene-vinyl acetate copolymers, vinyl acetate-ethylene copolymers, acrylic resins, urethane resins, and polyamide resins. Particularly preferred is a material capable of providing ink with a softening temperature as high as 50°-160° C. and a fused viscosity as high as 20,000 to 200,000 cp. Also waxes may be added for regulating the film forming property. The above-mentioned softening point means the flow start temperature of the specimen, measured with a Shimazu flow tester model CFT500, with a load of 10 kg, and a temperature elevating rate of 2° C./min., and the fused viscosity is defined by the measurement with an E-type rotary viscosimeter.

If the thermal transfer ink layer is composed of two layers, the layer not contacting the recording sheet may be composed of wax such as carnauba wax or paraffin wax, or polyethylene oxide.

A film-formed image is formed on the recording sheet 5 by image recording with the ink containing the above-mentioned component. The recorded image can be lifted off by using a thermosensitive adhesive tape having a thermosensitive adhesive layer which is rendered adhesive when heated, overlaying said adhesive layer on the erroneous recorded image and heating said tape with the recording head 1, thereby peeling off the recorded image together with the thermosensitive adhesive tape from the recording sheet 5.

The thermosensitive adhesive tape can be composed of a known substrate film composed for example of polyester or nylon, and a thermosensitive adhesive layer composed for example of oleffinic homopolymer or copolymer such as polyethylene, polypropylene, polyisobutylene, ethylene-vinyl acetate copolymer, ethylene-acrylic acid copolymer, or ethylene-ethyl acrylate copolymer, or a derivative thereof, or polyamide, polyester, polyurethane or acrylic adhesive, or styrenic block copolymer such as styrene-isobutylene copolymer, styrene-butadiene copolymer, styrene-ethylene-butylene copolymer etc., or a mixture of the foregoing substances, eventually containing a viscosifying agent such as alicyclic hydrocarbons, terpenes, rosin etc., fillers such as talc or calcium carbonate, stabilizers such as an antioxidant and formed with a thickness of 1–20 microns. The thermosensitive adhesive layer does not have adhesivity at the room temperature but is rendered adhesive only when heated with the recording head 1.

Other Embodiments

In the foregoing embodiment, the heating signals are detected in an area, around the dot to be activated, of four preceding dots, one succeeding dot, one upper dot and one lower dot, but the present invention is not limited to such an area. The detecting area can be suitably determined in consideration of the type and form of the recording head, and the temperature around the recording unit. More specifically, the detecting area can be suitably determined according to the conditions of use of the recording head, for example to detect the number of simultaneously activated elements or to detect the heating signals in ten preceding dots and ten succeeding dots at a particular heat generating time.

Also in the foregoing embodiment, the pulse $t_3$ is started from the beginning of the pulse cycle T as shown in FIG. 5, but said pulse may be started from another part of the pulse cycle time T to achieve the same effect.

Also for accelerating the temperature elevation, a preheating operation may be added immediately before the start of the image signal. Furthermore the energy control can be achieved by a change in the supplied voltage V instead of the change in pulse width. For such a voltage change, said pulse width in FIG. 3 is replaced by a voltage, and a voltage control signal is supplied, instead of the strobe signal, to a current controller to regulate the voltage.

In the thermal transfer recording of the foregoing embodiment, the thermal transfer ink and the thermosensitive adhesive layer need not be those composed of the aforementioned components but can be any conventionally known ones. Also the recording method is not limited to the thermal transfer recording, but can also be thermosensitive recording utilizing a thermosensitive recording sheet.

Experimental Results

In the following there are shown experimental results of a recording with the control of the foregoing embodiment, and a conventional recording with a constant pulse width.

Experiment 1

Figure 8:
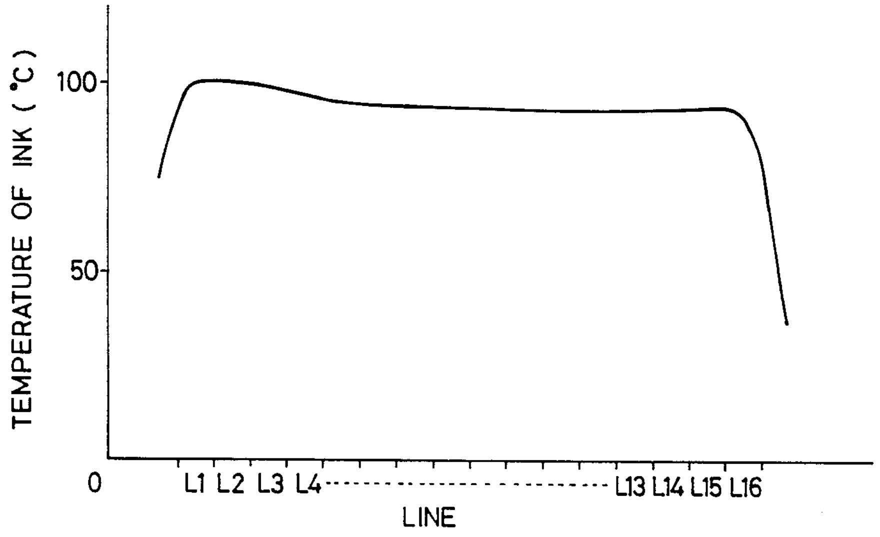
FIG. 8 is a chart showing the temperature change of the ink in recording the pattern shown in FIG. 4 with the pulses shown in FIG. 5.

At first shown is the result of recording of an image pattern shown in FIG. 4 with the control of the foregoing embodiment. FIG. 8 shows the temperature of the thermal transfer ink, measured with an infrared microscope manufactured by Japan Sensor Corporation, at the heat generating element $D_8$ shown in FIG. 4, when it is activated from $L_1$ to $L_{16}$.

As shown in FIG. 8, it is confirmed that the temperature is higher at the start end of the image, but is lower in the middle of the image where the thermal signals are present in a large number in the surrounding dots. Such temperature change is obtained also in the dots of the other elements $D_6$, $D_7$, $D_9$, $D_{10}$, $D_{11}$ and $D_{12}$ where the heating signals are present in all four preceding dots, one succeeding dot, one upper dot and one lower dot of the dot to be activated.

A recording operation with such a driving method provided, on the recording sheet 5, presents a clear image with satisfactory sharpness at the end portions of the image, without local unevenness in density.

In the aforementioned algorithm, the pulse width in the case (5) need not be limited to $t_3$ but can be selected to be longer without an undesirable effect on the image.

Experiment 2

In recording the image pattern shown in FIG. 4, there was employed an ink ribbon 3 having, on a polyethylene terephthalate film of a thickness of 6 microns, three thermal transfer ink layers of the following compositions (composition 1), and the recording was made on the recording sheet 5 with the above-explained control method.

Then a thermosensitive adhesive tape having, on a polyethylene terephthalate film of a thickness of 6 microns, a thermosensitive adhesive layer of the following composition (composition 2), was overlaid in such a manner that said recorded image was in contact with said thermosensitive adhesive layer, and a correcting operation was conducted by heating with the recording head 1.

In the following description, the percentage and the parts are given in weight unless otherwise specified.

Composition 1

| | | |
|---|---|---|
| Layer 1 (1 μm) | Polyethylene oxide emulsion (base resin: drip point 103° C.) | |
| Layer 2 (2 μm) | Ethylene-vinyl acetate copolymer emulsion (base resin M115: vinyl acetate content 28%) | 40 parts |
| | Polyethylene oxide emulsion (base resin: drip point 140° C.) | 20 parts |
| | Vinyl acetate-ethylene copolymer emulsion (base resin: vinyl acetate content 86%) | 10 parts |
| | Carbon black aqueous dispersion | 30 parts |
| Layer 3 (2 μm) | Ethylene-vinyl acetate copolymer emulsion (base resin M115: vinyl acetate content 28%) | 40 parts |
| | Ethylene-methacrylic acid-styrene | 30 parts |

-continued

| | |
|---|---|
| copolymer emulsion | |
| Vinyl acetate-ethylene copolymer emulsion (base resin: vinyl acetate content 80%) | 20 parts |
| Carbon black aqueous dispersion | 10 parts |

Recording Condition

| | | |
|---|---|---|
| Recording head | dot size | 0.141 mm × 0.125 mm |
| | dot pitch | 0.141 mm |
| Energy applied | | 0.3 mj/dot |

Composition 2

| | |
|---|---|
| Ethylene-vinyl acetate copolymer (base resin M115: vinyl acetate content 34%) | 85 parts |
| Adhesivity increasing agent (alicyclic saturated hydrocarbon) | 10 parts |
| Talc | 4 parts |
| Antioxidant | 1 part |

The image recorded on the recording sheet 5 by transfer from the ink ribbon 3 did not penetrate into the sheet 5 but formed a film-formed image, which could be peeled off, together with the adhesive layer of the thermosensitive adhesive tape, from the recording sheet without any remnant thereon, thus achieving complete correction by lift-off operation.

Experiment 3

Figure 9:
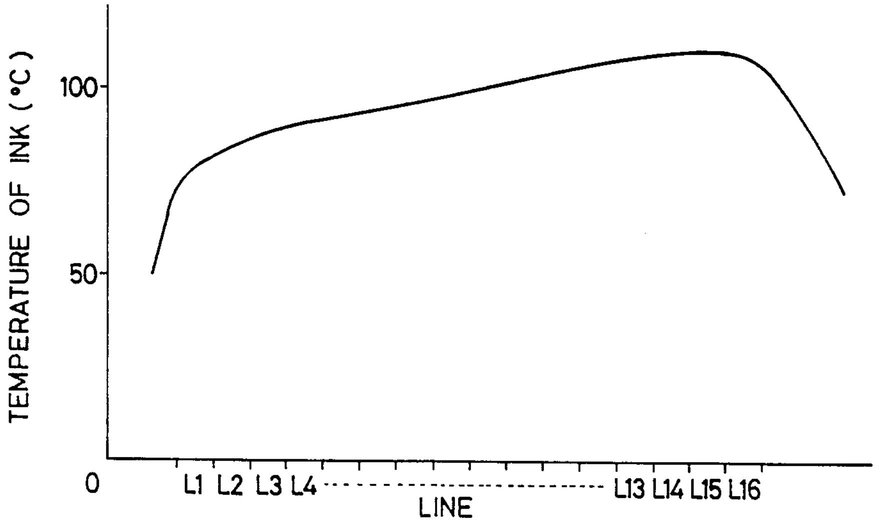
FIG. 9 is a chart showing the temperature change of the ink in recording the pattern shown in FIG. 4 with a constant pulse duration.

FIG. 9 shows the temperature of the thermal transfer ink at the element $D_8$ shown in FIG. 4, when it was activated from $L_1$ to $L_{16}$, in a recording operation of the image pattern shown in FIG. 4 under the same conditions as explained above, except that the pulse width was always maintained at $t=0.9$ ms.

As shown in FIG. 9, the temperature is lower in the initial portion from $L_1$ to $L_5$, but becomes higher thereafter due to the heat accumulation in the glaze portion. Consequently the recording operation with a constant pulse width provided an image which is thin in density in the left-hand end portion and shows trailing in the right-hand end portion, with local fluctuation in density. Also in the lift-off operation, the image could not be uniformly erased but showed locally remaining portions, particularly in the positions surrounded by many dots, due to excessive penetration of the thermal transfer ink into the sheet.

The foregoing embodiments, in which the energy supplied to the heat generating elements of the recording head is controlled according to the state of heating signals, have the advantages of preventing uneven image density resulting from the heat accumulation in the recording head, and avoiding insufficient image erasure by lift-off operation.

As explained in the foregoing, the present invention provides a driving method for a thermal head, capable of providing a clear recorded image, and a thermal printer utilizing said driving method.

What we claim is:

1. A driving method for a thermal head having plural heat generating elements for image recording on a recording medium, which comprises the steps of:

detecting the presence of past, present and future heating signals in an area, in at least four directions around each heat generating element when power is supplied to each heat generating element according to a heating signal; and controlling the supply energy to each heat generating element in response to the result of said detection, if the heating signals are present in all the detecting area, for minimizing the supply energy to each heat generating element in comparison with a case in which the heating signals are not present in all the detecting area.

2. A driving method according to claim 1, wherein detecting the presence of heating signals in the four directions includes detecting the presence of heating signals for an immediately preceding position and an immediately succeeding position of each heat generating element to be powered, and the presence of heating signals for heat generating elements positioned above and below each said heat generating element.

3. A driving method according to claim 1, further including erasing the image recorded on said recording medium if necessary.

4. A driving method according to claim 1, wherein an ink ribbon is positioned between the thermal head and the recording medium, and including transferring the ink of the ink ribbon onto the recording medium by the heat generation of the heat generating elements of the thermal head.

5. A driving method according to claim 1, including positioning the ink ribbon between the thermal head and the recording medium and providing the ink ribbon with emulsion ink.

6. A driving method according to claim 1, further including minimizing the power supply to each heat generating element within a selectable range when the heating signals are present in all the detecting area.

7. A thermal printer for image recording on a recording medium with a thermal head having plural heat generating elements, comprising:

means for causing relative movement of the thermal head and the recording medium;

transport means for transporting said recording medium to an image recording position with said thermal head; and control means adapted, in the power supply to each heat generating element according to a heating signal, to detect the presence of past, present and future heating signals, in an area, in at least four directions around each said heat generating element and to control the supply energy to each said heat generating element in response to the result of said detection, if the heating signals are present in all the detecting area, to minimize the supply energy to each said heat generating element in comparison with a case in which the heating signals are not present in all the detecting area.

8. A thermal printer according to claim 7, wherein detecting said presence of the heating signals in the four directions includes means for detecting the presence of heating signals for an immediately preceding position and an immediately succeeding position of each said heat generating element to be powered, and the presence of heating signals for heat generating elements positioned above and below each said heat generating element.

9. A thermal printer according to claim 7, wherein the image recorded on said recording medium is erasable if necessary.

10. A thermal printer according to claim 7, wherein an ink ribbon is positioned between said thermal head and said recording medium, and including transferring means for transferring the ink of said ink ribbon onto said recording medium by the heat generation of the heat generating elements of the thermal head.

11. A thermal printer according to claim 7, wherein an ink ribbon positioned between said thermal head and said recording medium is provided with emulsion ink.

12. A thermal printer according to claim 7, wherein the power supply to each said heat generating element is minimized within a selectable range when the heating signals are present in all the detecting area.

13. A thermal printer for recording an image which is erasable if necessary, comprising:
- a mounting unit for mounting an ink ribbon having emulsion ink;
- a thermal head having plural heat generating elements;
- means for causing relative movement of said thermal head and a recording medium; and
- control means adapted, in the power supply to each heat generating element according to a heating signal, to detect the presence of past, present and future heating signals, in an area, in at least four directions around each said heat generating element and to control the supply energy to each said heat generating element in response to the result of said detection, if the heating signals are present in all the detecting area, to minimize the supply energy to each said heat generating element in comparison with a case in which the heating signals are not present in all the detecting area.

14. A thermal printer according to claim 13, wherein detecting said presence of the heating signals in the four directions includes means for detecting the presence of heating signals for an immediately preceding position and an immediately succeeding position of each said heat generating element to be powered, and the presence of heating signals for heat generating elements positioned above and below the each said heat generating element.

15. A thermal printer according to claim 14, wherein said recorded image is erasable for correcting erroneous recording.

16. A thermal printer according to claim 13, wherein the power supply to each said heat generating element is minimized within a selectable range when the heating signals are present in all the detecting area.

* * * * *

UNITED STATES PATENT AND TRADEMARK OFFICE

CERTIFICATE OF CORRECTION

PATENT NO. : 4,870,428

DATED : September 26, 1989

INVENTOR(S) : NOBUYUKI KUWABARA, ET AL.

It is certified that error appears in the above-identified patent and that said Letters Patent is hereby corrected as shown below:

COLUMN 1

Line 11, "utlizing" should read --utilizing--.
Line 23, "is already" should read --is recently already--.
Line 24, "recently" should be deleted.

COLUMN 6

Line 36, "heat generating element a" should read --heat generating element 1a--.
Line 56, "includes" should read --include--.

COLUMN 7

Line 18, "oleffinic homopolymer" should read --olefinic homopolymer--.

UNITED STATES PATENT AND TRADEMARK OFFICE

CERTIFICATE OF CORRECTION

PATENT NO. : 4,870,428

DATED : September 26, 1989

INVENTOR(S) : NOBUYUKI KUWABARA, ET AL.

It is certified that error appears in the above-identified patent and that said Letters Patent is hereby corrected as shown below:

COLUMN 9

Line 29, "recording sheet" should read --recording sheet 5--.

Signed and Sealed this

Twenty-fourth Day of September, 1991

Attest:

HARRY F. MANBECK, JR.

*Attesting Officer*

*Commissioner of Patents and Trademarks*